United States Patent [19]

Sadahiro

[11] Patent Number: 5,440,960
[45] Date of Patent: Aug. 15, 1995

[54] SAWDUST REMOVING DEVICE IN SAWING MACHINE
[75] Inventor: Toru Sadahiro, Isehara, Japan
[73] Assignee: Amada Company, Limited, Japan
[21] Appl. No.: 856,222
[22] PCT Filed: Nov. 6, 1991
[86] PCT No.: PCT/JP91/01518
§ 371 Date: May 13, 1992
§ 102(e) Date: May 13, 1992
[87] PCT Pub. No.: WO93/08948
PCT Pub. Date: May 13, 1993
[51] Int. Cl.6 .................. B23D 59/00; B27B 13/16
[52] U.S. Cl. ...................... 83/168; 83/788; 15/256.5
[58] Field of Search .......... 83/168, 101, 788; 15/256.5

[56] References Cited
U.S. PATENT DOCUMENTS

| 417,093 | 12/1889 | Robison | 83/168 X |
|---|---|---|---|
| 1,336,239 | 4/1920 | Kinraide | 83/168 X |
| 2,466,644 | 4/1949 | McBride | 15/256.5 X |
| 2,619,009 | 11/1952 | Begle | 83/168 X |
| 2,953,952 | 9/1960 | Alexander | 15/256.5 X |
| 3,485,123 | 12/1969 | Komendowski | 83/168 |
| 4,003,276 | 1/1977 | Schmitt | 83/168 X |
| 4,633,999 | 1/1987 | Perneczky | 15/256.5 X |
| 4,830,553 | 5/1989 | Abeyta et al. | 83/168 X |
| 4,893,533 | 1/1990 | Harris | 83/168 X |

FOREIGN PATENT DOCUMENTS

| 50-26072 | 8/1975 | Japan . |
| 59-142044 | 8/1984 | Japan . |
| 60-29421 | 2/1985 | Japan . |
| 62-11527 | 1/1987 | Japan . |
| 63-10244 | 3/1988 | Japan . |
| 01177912 | 7/1989 | Japan . |
| 906104 | 9/1962 | United Kingdom ........ 83/101 |

Primary Examiner—Richard K. Seidel
Assistant Examiner—Clark F. Dexter
Attorney, Agent, or Firm—Wigman, Cohen, Leitner & Myers

[57] ABSTRACT

A device for removing sawdust adhering to a saw blade of a sawing machine, comprising a cleaning instrument supported by a supporting member attachable to a saw blade housing in which the saw blade is mounted and adapted to move relative to the saw blade, and a device for adjusting an overlap between the cleaning instrument and the saw blade so that the overlap can be maintained always at a suitable value.

9 Claims, 8 Drawing Sheets

SAWDUST REMOVING DEVICE IN SAWING MACHINE

DESCRIPTION

1. Technical Field

This invention relates to a device for removing sawdust adhering to a saw blade of a sawing machine, and in particular to a sawdust removing device provided with a cleaning instrument such as a brush for which a suitable overlap with respect to the saw bade is always maintained so that the sawdust is always removed from the saw blade.

2. Background Art

In the prior art, a sawdust removing device for a sawing machine, such as a circular rotary wire brush, overlaps the saw blade and is rotated to clear the sawdust from the saw blade.

However, such a rotary wire brush fails to remove the sawdust from the saw blade due to abrasion after being used for many hours. Hence, the operator of the sawing machine must watch the abrasion of the wire brush and adjust the overlap between the brush and the saw blade when the brush is worn to a certain extent. Finally, when the wear on the wire brush reaches a preset limit, the operator must replace the wire brush.

When the wire brush wears to a certain extent as mentioned above, the operator adjusts the overlap between the wire brush and the saw blade to a suitable amount. However, the amount of the adjusted overlap tends to differ, depending on the individual preferences of the operators. Furthermore, the operator may sometimes forget to adjust the overlap. In order to resolve these problems, a technique has been developed as shown, for example, in Japanese patent (A) 1-177912, for automatically detecting the amount of abrasion of the wire brush and adjusting the amount of overlap between the saw blade and the wire brush.

In the above Japanese patent, an available automatic sawdust removing device is disclosed. The device is equipped with a wire brush which moves from a position where it clears the sawdust from the saw blade to another position where the amount of abrasion of the wire brush is automatically detected. After the amount of abrasion is detected, the position of the wire brush is adjusted according to the detected amount. Thus, the amount of overlap is automatically adjusted and is always maintained within a certain suitable value.

There are, however, some drawbacks in the device to be overcome. In the device, the amount of abrasion of the wire brush is periodically detected even if the brush is not badly worn, resulting in wasted effort. On the other hand, the adjustment of the overlap is sometimes not carried out regardless of heavy abrasion which has occurred in a short time and which causes the wire brush to fail to clear the sawdust from the saw blade. The degree or rate of abrasion of the wire brush differs according to the type of a saw blade used, changes in cutting conditions, and so on. It is therefore difficult to determine a suitable period for the device to detect the amount of abrasion of the wire brush.

DISCLOSURE OF INVENTION

The object of the present invention is therefore to overcome these problems and provide a device for positively removing saw dust from the saw blade of the sawing machine.

The device of the present invention includes a supporting member, for reciprocatingly moving towards and receding from the saw blade, mounted on a saw blade housing in which the saw blade is mounted, a cleaning instrument supported by the supporting member, and a device for adjusting the overlap of the cleaning instrument with respect to the saw blade to always maintain a suitable overlap.

The sawdust adhering to the saw blade is removed by the cleaning instrument by moving the supporting member towards the saw blade so that the cleaning instrument supported by the supporting member can overlap the saw blade. A suitable overlap between the saw blade and the cleaning instrument is always maintained, and the cleaning instrument is actuated, thus the sawdust is positively removed from the saw blade.

BEST MODE FOR CARRYING OUT THE INVENTION

In order to make it easy to understand the device of the present invention, the general constitution of a sawing machine will first be described. Although a band saw machine of a lateral type is here described, the device of the present invention can for example be used also for a circular saw machine and a hack saw as well as a band saw machine of a vertical type.

Figure 1:
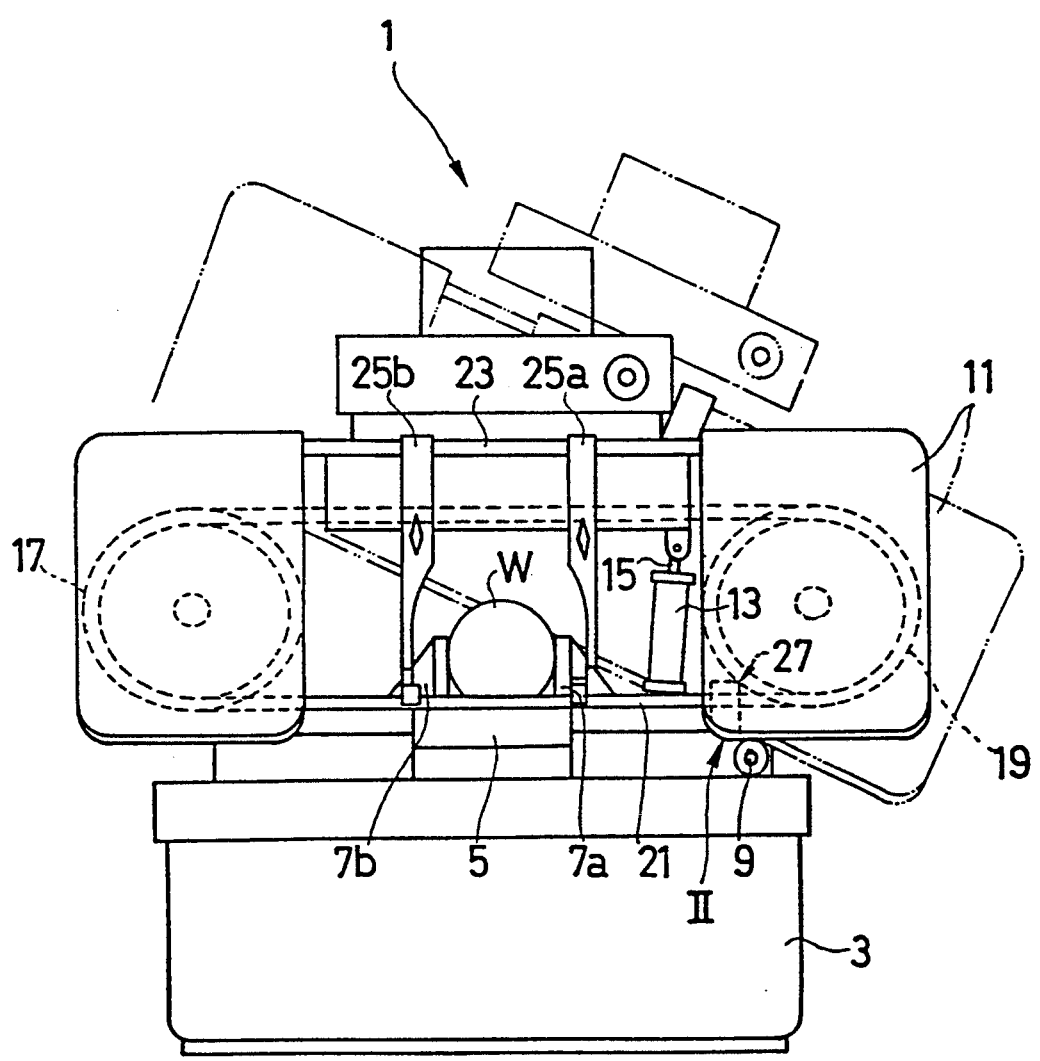
FIG. 1 is a front view showing a sawing machine provided with a sawdust removing device of the present invention.

FIG. 1 shows a lateral-type band saw machine 1 as one type of sawing machine. The band saw machine 1 is mounted on a box-shaped base 3. A worktable 5 and a pair of vises 7a, 7b respectively for supporting and securing a workpiece W to be cut are positioned on the base 3. The first vise 7a is fixed, and the second vise 7b is movably provided relative to the first vise 7a (to the right and left in FIG. 1). The worktable 5 is a component of the base 3.

A vertically rotatable housing 11 is mounted on the base 3 through a hinge shaft 9, while a cylinder 13 for rotating the housing 11 is attached to the base 3. The upper end of a piston rod 15 of the cylinder 13 is suitably connected to the housing 11. Another configuration may be alternatively used for vertically moving the housing with respect to the base 3. For example, the housing may be guided along upright guiding posts supported on the base.

A drive wheel 19 and a follower wheel 17 are rotatably mounted in the housing 11, and an endless band saw blade 21 is engaged with the drive and follower wheels 19 and 17. A drive device (not shown) is connected to the drive wheel 19 to rotate the drive wheel 19.

The housing 11 is provided with a beam 23 to which a pair of movable saw blade guides 25a, 25b are attached. The saw blade guides 25a, 25b hold the saw blade 21 perpendicular to the workpiece W supported on the worktable 5. The first saw blade guide 25a is fixed, while the second saw blade guide 25b is movably provided relative to the first guide 25a (to the right and left in FIG. 1).

The vise 7b is moved towards the vice 7a to secure the workpiece W on the worktable 5, and then the rotating device (not shown) is actuated to run the band saw blade 21. At the same time, the cylinder 13 is actuated to rotate the saw blade 21 downward. Therefore, the workpiece W is cut by the band saw blade 21 guided and held by the guides 25a, 25b perpendicular to the workpiece W.

The housing 11 is provided with a device 27 for removing sawdust produced during the cutting of the workpiece W and adhering to the saw blade 21.

Figure 2:
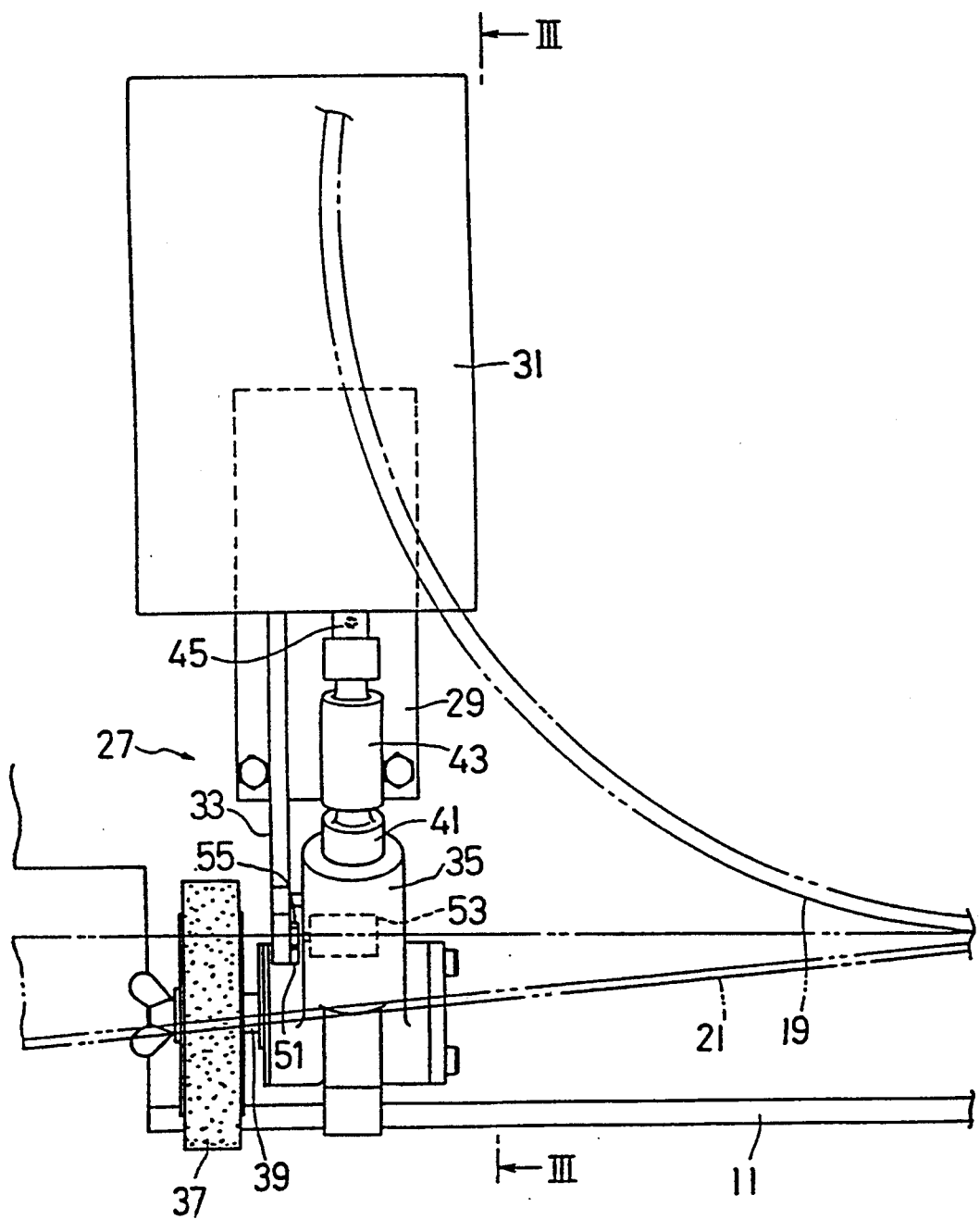
FIG. 2 is an enlarged front view showing a part of the sawing machine, taken in the direction of the arrow II in FIG. 1.

Referring now to FIGS. 1 and 2, the sawdust removing device 27 is mounted on the saw blade housing 11 which supports the saw blade 21. In the sawdust removing device 27, a bracket 29 is suitably attached to the saw blade housing 11 by a plurality of bolts. A motor 31 is suitably mounted on the bracket 29, and a guide bracket 33 is integrally attached to the bracket 29.

The guide bracket 33 supports a supporting member 35 which bears a rotary cleaning instrument 37. The cleaning instrument 37 is in the shape of a disk and is made of a suitable material such as rubber, soft metal, or the like, or is a circular resin or wire brush and serves to remove sawdust adhering to the saw blade 21. The cleaning instrument 37 is detachably mounted on a rotary drive shaft 39 provided on the supporting member 35.

The supporting member 35 is provided with a torque transmission rotary shaft 41 which transmits the torque of the motor 31 to the drive shaft 39. The torque transmission shaft 41 is connected to a drive shaft 45 of the motor 31 through a universal joint 43 so that the torque transmission shaft 41 can be rotated by the motor 31. The torque of the transmission shaft 41 is transmitted to the drive shaft 39 through, for example, a bevel gear, etc.

The sawdust removing device 27 is designed as mentioned above, therefore the sawdust adhering to the saw blade is removed while the outer edge of the cleaning instrument 37 overlaps the saw blade 21, and the cleaning instrument 37 is rotated by the motor 31.

In order to adjust the amount of overlap of the cleaning instrument 37, the supporting member 35 is provided for reciprocatingly moving towards and receding from the saw blade 21, and the sawdust removing device 27 is provided with an overlap adjusting device which will now be explained.

Figure 3:
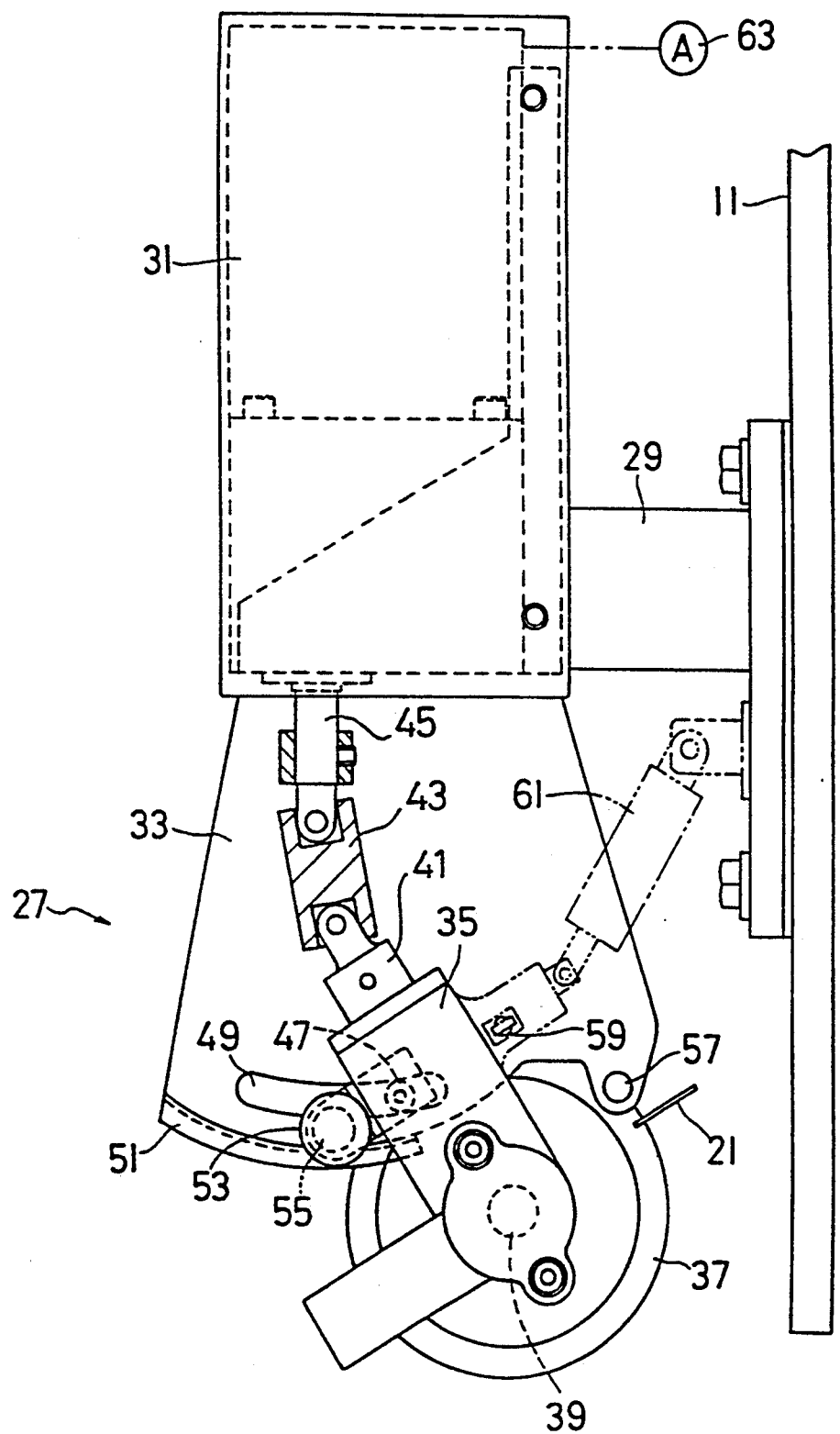
FIG. 3 is a side view taken along a line III—III in FIG. 2.

With reference to FIG. 3, in the configuration of the sawdust removing device 27, the guide bracket 33 is formed with an arched rack 51 as well as an arched guide hole 49 for guiding the supporting member 35 through a plurality of guide rollers 47 attached to the supporting member 35 in the direction relative to the saw blade 21. A suitable motor 53 is secured to the supporting member 35, and a pinion 55 driven by the motor 53 engages the rack 51.

Hence, the supporting member 35 can be moved towards and away from the saw blade 21 along both the guide hole 49 and the rack 51 by suitably controlling the motor 53, and therefore the amount of overlap of the cleaning instrument 37 is adjusted with respect to the saw blade 21.

In order to maintain a suitable overlap of the cleaning instrument 37 with the saw blade 21, the overlap adjusting device is provided with a sensor 57 for detecting the cleaning instrument 37, namely the presence of the outer edge of the cleaning instrument 37. The sensor 57 is mounted on the guide bracket 33 close to the saw blade.

The sensor 57 may be a push switch, proximity sensor switch, optical switch, or other suitable device. The sensor 57 serves to control the activation and deactivation of the motor 53 through a controlling device (not shown) when detecting the abrasion of the cleaning instrument 37. When the cleaning instrument 37 is worn so that the amount of overlap between the cleaning instrument 37 and the saw blade 21 has decreased and is no longer in the suitable range, the sensor 57 detects the decrease in the amount of the overlap and activates the motor 53 to move the supporting member 35 towards the saw blade 21. The sensor 57 detects if the outer edge of the cleaning instrument 37 has suitably approached the saw blade 21 and, if so, deactivates the motor 53. Thus, the amount of overlap is adjusted to a suitable value.

As can be understood from the above explanation of the embodiment of the invention, the amount of overlap of the cleaning instrument 37 with the saw blade 21 is controlled and always maintained at a suitable value.

Another sensor 59 is provided on the guide bracket 33. The sensor 59 detects the abrasion of the cleaning instrument 37 which has reached a limit value within which the cleaning instrument 37 can be used. The sensor 59 may be a limit switch, proximity sensor switch, or the like. The sensor 59 is activated by the supporting member 35 when the supporting member 35 approaches closest to the saw blade 21.

Hence, the activation of the sensor 59 means that the cleaning instrument is worn to the limit value and is to be replaced.

As can be seen in the above, a suitable overlap of the cleaning instrument 37 with the saw blade 21 is always maintained in the sawdust removing device 27, and therefore the sawdust can always be removed. Furthermore, the above mentioned problem of failing to remove the sawdust from the saw blade 21 is overcome since the wear of the cleaning instrument 37 is positively detected by the sensor 59.

In the embodiment described above, the means for moving the supporting member 35 relative to the saw blade 21 mainly consist of the rack 51, the pinion 55, and the torque motor 53. However, an actuator such as a fluid cylinder 61 shown by the phantom lines in FIG. 3 may be alternatively used.

Although the sensor 57 is provided adjacent to the saw blade 21 in the above embodiment in order to maintain the overlap between the cleaning instrument 37 and the saw blade 21, a configuration other than this may be used.

For example, sensing means for detecting the load of the motor 31 are available so as to maintain the amount of overlap between the cleaning instrument and the saw blade since the load of the motor increases or decreases according to changes in the amount of overlap.

The sensing means are now explained. A current detecting device 63, which is shown by an phantom line in FIG. 3, is provided for detecting the load of the motor 31. The detecting device 63 detects the load of the motor 31 at certain intervals during each of which little abrasion of the cleaning instrument 37 occurs. The detected values are compared with a predetermined allowable value. If the detected value is larger than the predetermined value, the amount of overlap of the cleaning instrument 37 with the saw blade 21 is excessive. Therefore, the motor 53 or fluid cylinder 61 is actuated to move the supporting member 35 away from the saw blade 21.

Conversely, if the detected value is smaller than the predetermined allowable value, the amount of overlap is less than the suitable amount. The supporting member 35 is therefore moved by the actuator 53 or 61 towards the saw blade 21 to adjust the amount of overlap.

The load of the motor 31 is detected during the movement of the supporting member 35. When the detected value becomes equal to the allowable value, the movement of the supporting member 35 is stopped, and as a result, the overlap is adjusted to a suitable amount.

As described above, this design for detecting the load of the motor 31 to adjust the amount of overlap yields an effect the same as in the above explained embodiment.

Figure 4:
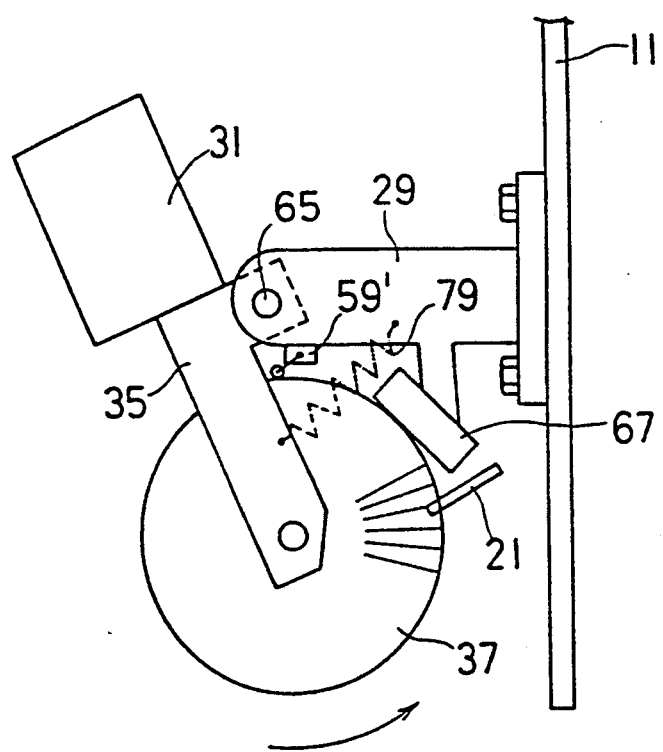
FIG. 4 is an explanatory drawing showing a second embodiment of the device of the present invention.

FIG. 4 shows a schematic drawing of a modified embodiment of the present invention. In this embodiment, the rotatable supporting member 35 on which the rotary cleaning instrument 37 is supported is mounted through a pin 65 on the bracket 29 secured to the saw blade housing 11. The supporting member 35 is energized by the weight of the motor 31 so that it can move towards the saw blade 21. A limit member 67 is provided on the bracket 29 close to the saw blade 21, for obtaining a suitable amount of overlap between the cleaning instrument 37 and the saw blade 21. In this configuration, the edge of the cleaning instrument 37 comes into contact with the limit member 67 since the energized supporting member 35 moves towards the limit member 67. Hence, the overlap between the cleaning instrument 37 and the saw blade 21 is always maintained at a suitable value. The limit member 67 is in the shape of a plate in the drawing, however, the limit member 67 may be a roller mounted on the bracket 29, or in particular, a limit switch in connection with the above embodiment.

As has been understood in this embodiment, the cleaning instrument 37 is automatically moved towards the saw blade 21 an amount equal to the wear, and is always maintained in a position where it contacts the limit member 67.

The sensor 59' for detecting the limit of use of the cleaning instrument 37 is also provided in this embodiment. The sensor 59' detects the wear of the cleaning instrument in the same manner as described above.

Figure 5:
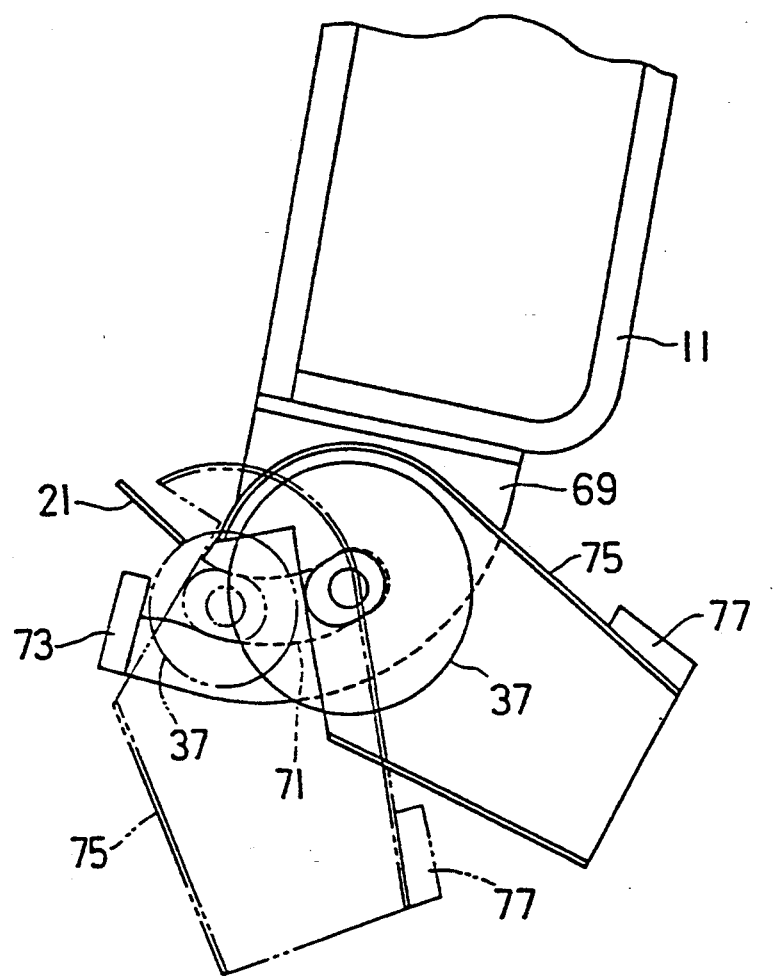
FIG. 5 is an explanatory drawing showing a third embodiment of the device of the present invention.

FIG. 5 shows another embodiment of the sawdust removing device of the present invention. In this embodiment, a guide bracket 69 is attached to the bottom of the saw blade housing 11. The bracket 69 is formed with an arched guide hole 71, and a limit member 73 is attached to a free end of the guide bracket 69. A cover 75, which supports a rotary drive shaft of the cleaning instrument 37, is disposed for sliding along the arched hole 71. A weight 77 is attached to the cover 75, for helping the cover 75 to move towards the saw blade 21. The use of the weight 77 may be omitted if the cover 75 can move of its own weight towards the saw blade 21.

As can be understood from the above configuration, the cleaning instrument 37 is energized by means of the weight 77 to move towards the saw blade 21, and comes into contact with the limit member 73. Therefore, the overlap is maintained at a suitable amount between the cleaning instrument 37 and the saw blade 21.

An elastic member such as a coil spring, windup spring or the like can alternatively be used for energizing the cleaning instrument 37 to move towards the saw blade 21. For example, a tensioned coil spring 79 may be disposed between the bracket 29 and the cleaning instrument 37 as shown in FIG. 4.

Figure 6:
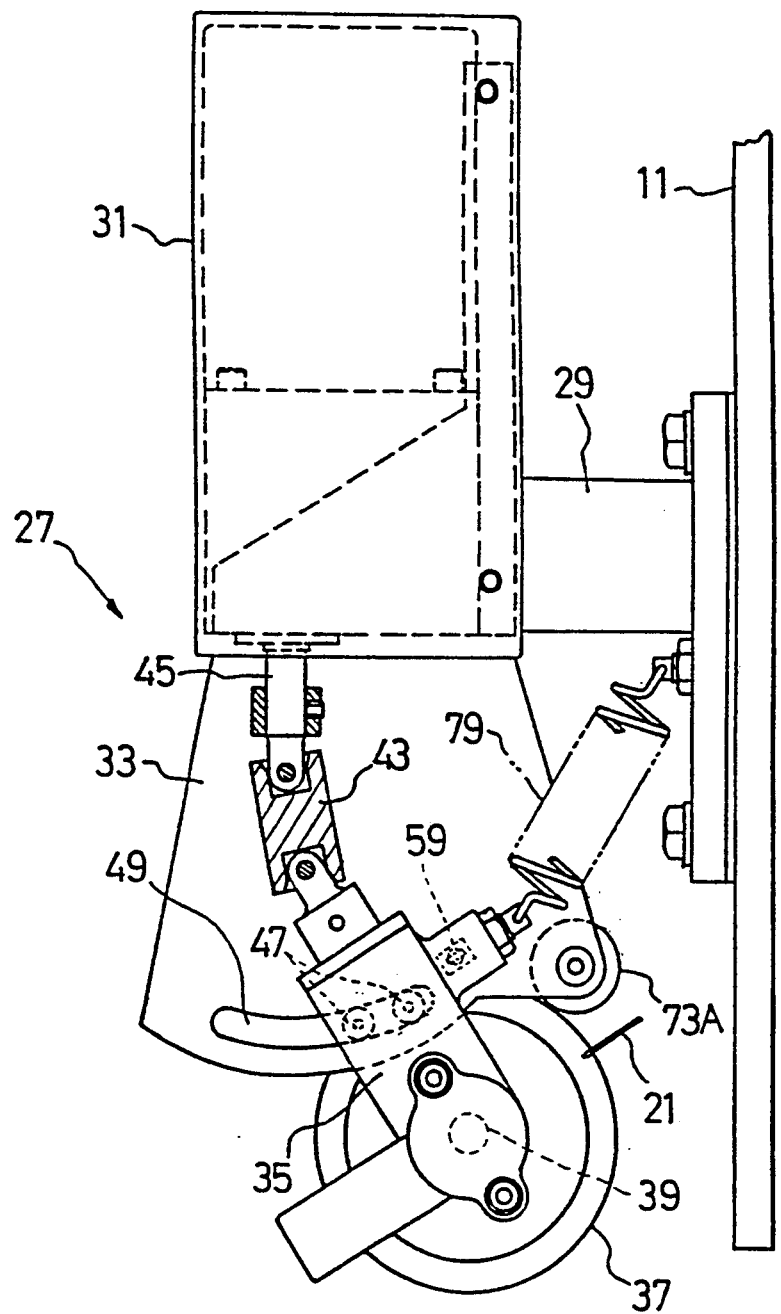
FIG. 6 is an explanatory drawing showing a fourth embodiment of the device of the present invention.

FIG. 6 shows a further embodiment of the sawdust removing device 27 which is similar to that shown in FIG. 3. In this embodiment, the rack 51, motor 53, and sensor 67 are not used, and a tensioned coil spring 79 is provided between the supporting member 35 and the bracket 29, and a roller 73A, which serves as a limit member, is attached to the guide bracket 33.

In this design, the cleaning instrument 37 contacts the roller 73A by means of the energized coil spring 79 so that the overlap is always limited or maintained at a suitable value between the cleaning instrument 37 and the saw blade 21.

Figure 7:
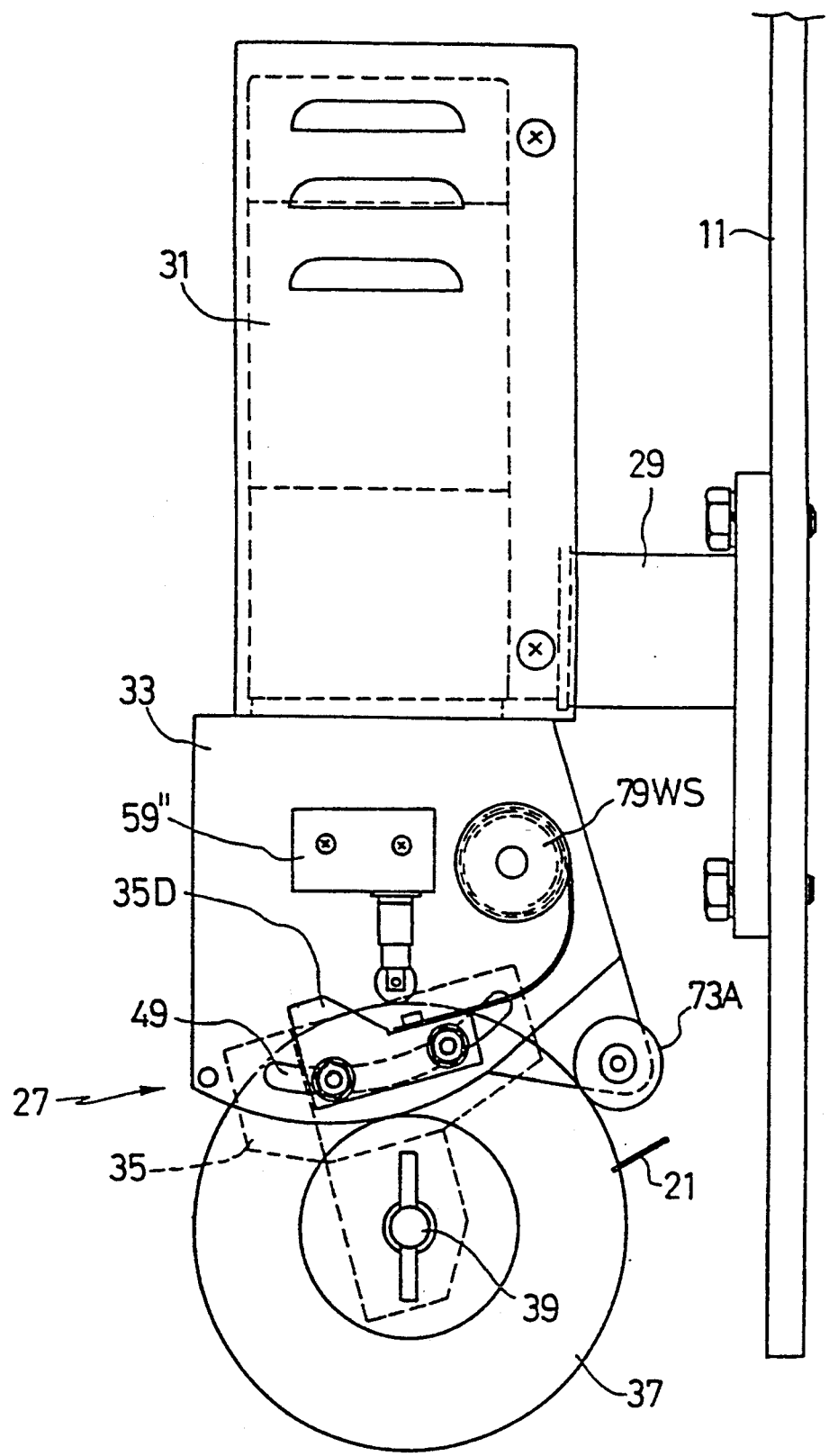
FIG. 7 is an explanatory drawing showing a fifth embodiment of the device of the present invention.

FIG. 7 shows a further embodiment of the sawdust removing device 27 similar to that shown in FIG. 6. In this embodiment, a windup spring 79WS is used instead of the coil spring 79 to thrust the supporting member 35 against the saw blade 21. Furthermore, a dog block 35D is provided for cooperating with the sensor 59" for detecting the limit of use of the cleaning instrument 37.

This configuration has the same function as those described above.

In the above embodiments, a rotary brush or the like which serves as a cleaning instrument 37 is used in the sawdust removing device. However, the cleaning instrument 37 need not always be rotated.

Figure 8:
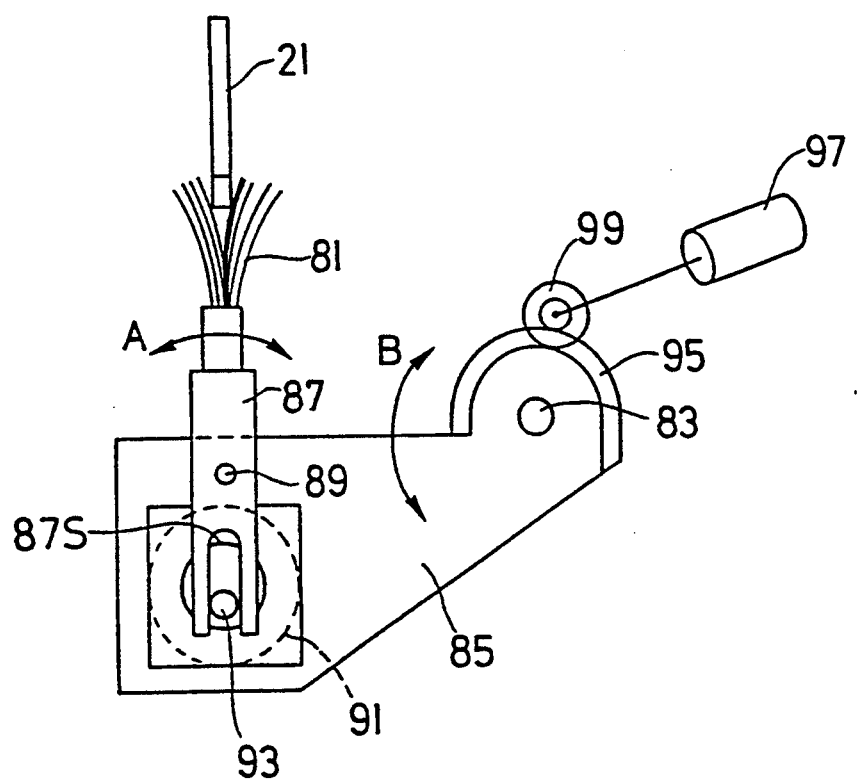
FIG. 8 is an explanatory drawing showing a sixth embodiment of the device of the present invention.

FIG. 8 shows a further embodiment of the sawdust removing device wherein a cleaning instrument 81 such as a brush or the like swings to sweep away the sawdust from the saw blade 21. In this embodiment, the supporting member 85 rotates around a hinge pin 83 to move towards and way from the saw blade 21. The cleaning instrument 81 is detachably mounted on a swing member 87 pivotally supported on a free end of the supporting member 85. The swing member 87 is provided with a slot 87S at the proximal end. A crank pin 93, which is eccentrically rotated by a motor 91 supported on the supporting member 85, engages the slot 87S. A pinion 99, which is rotated by a motor 97, engages a gear 95 provided on the supporting member 85 to rotate the supporting member 85.

Therefore, the cleaning instrument 81 swung by the motor 91 in the directions A shown by the double arrows can remove the sawdust from the saw blade 21. The overlap between the saw blade 21 and the cleaning instrument 81 is adjusted by controlling the position of the cleaning instrument 81 by suitably driving the motor 97. In this case, whether the amount of overlap is suitable or not will be known, for example, by detecting the load of the motor 91. Thus, the overlap is always and easily maintained at a suitable value.

INDUSTRIAL APPLICABILITY

The sawdust removing device of the present invention can be attached to all types of sawing machines and used for maintaining the overlap of the cleaning instrument 37 with the saw blade 21 of the sawing machine for positively clearing the sawdust from the saw blade.

We claim:

1. A sawing machine, comprising:
   a housing;
   a saw blade mounted in said housing;
   a supporting member mounted in said housing so as to be movable toward and away from said saw blade;
   a first actuator means for moving said supporting member toward and away from said saw blade;
   a cleaning instrument supported on said supporting member to remove sawdust from said saw blade, said cleaning instrument being movable relative to said supporting member and being engageable with said saw blade when said supporting member is moved toward said saw blade; and
   a first sensor means for detecting an engagement between said cleaning instrument and said saw blade;
   wherein said first actuator means is operatively controlled on the basis of signals generated by said first sensor means.

2. The sawing machine of claim 1, wherein said cleaning instrument has a disk shape, and said first sensor means includes a sensor mounted on said housing to detect an outer edge of said cleaning instrument.

3. The sawing machine of claim 1, further comprising a second actuator means for moving said cleaning instrument relative to said saw blade; wherein said first sensor means includes a sensor for detecting a load applied to said second actuator means when said second actuator means is actuated.

4. The sawing machine of claim 3, wherein said cleaning instrument is rotatable relative to said saw blade so that an outer periphery section of said cleaning instrument engages with said saw blade.

5. The sawing machine of claim 4, further comprising a second sensor means for detecting whether an abrasion of said cleaning instrument against said saw blade is greater than a predetermined value.

6. A sawing machine comprising:
   a housing;
   a saw blade mounted in said housing;
   a supporting member mounted in said housing so as to be movable toward and away from said saw blade;
   means for urging said supporting member toward the saw blade;
   a disc-shaped cleaning instrument supported on said supporting member, the cleaning instrument being rotatable relative to said supporting member to remove sawdust from said saw blade, and an outer periphery section of said cleaning instrument being engageable with said saw blade when said cleaning instrument is moved with said supporting member toward said saw blade; and
   a limiting means for stopping the movement of said supporting member and said cleaning instrument toward said saw blade, said limiting means being adapted to contact said outer periphery, and said limiting means being mounted on said housing so that said cleaning instrument engages with said saw blade to a predetermined extent when said outer periphery contacts said limiting means.

7. The sawing machine of claim 6, wherein said urging means is an elastic member.

8. The sawing machine of claim 7, wherein said elastic member is a spring.

9. The sawing machine of claim 6, wherein said urging means includes a weight mounted on said supporting means for urging said supporting means toward said saw blade.

* * * * *